(12) United States Patent
Stark et al.

(10) Patent No.: US 9,987,568 B2
(45) Date of Patent: Jun. 5, 2018

(54) PURGE SYSTEM FOR CHILLER SYSTEM

(71) Applicant: Carrier Corporation, Farmington, CT (US)

(72) Inventors: Michael A. Stark, Mooresville, NC (US); Haralambos Cordatos, Colchester, CT (US); Rajiv Ranjan, Vernon, CT (US)

(73) Assignee: CARRIER CORPORATION, Farmington, CT (US)

( * ) Notice: Subject to any disclaimer, the term of this patent is extended or adjusted under 35 U.S.C. 154(b) by 165 days.

(21) Appl. No.: 14/909,542

(22) PCT Filed: Jun. 4, 2014

(86) PCT No.: PCT/US2014/040795
§ 371 (c)(1),
(2) Date: Feb. 2, 2016

(87) PCT Pub. No.: WO2015/020719
PCT Pub. Date: Feb. 12, 2015

(65) Prior Publication Data
US 2016/0175740 A1 Jun. 23, 2016

Related U.S. Application Data

(60) Provisional application No. 61/864,133, filed on Aug. 9, 2013.

(51) Int. Cl.
*B01D 19/00* (2006.01)
*F25B 43/04* (2006.01)

(52) U.S. Cl.
CPC ..... *B01D 19/0063* (2013.01); *B01D 19/0031* (2013.01); *F25B 43/04* (2013.01);
(Continued)

(58) Field of Classification Search
CPC .... B01D 19/0031; F25B 43/04; F25B 43/043; F25B 2600/2519; F25B 2700/19; F25B 2700/195
See application file for complete search history.

(56) References Cited

U.S. PATENT DOCUMENTS 2,044,166 A 6/1936 Hayden
4,304,102 A 12/1981 Gray
(Continued)

FOREIGN PATENT DOCUMENTS

CN 1791774 A 6/2006
CN 101373111 A 2/2009
(Continued)

OTHER PUBLICATIONS

Chinese Office Action and Search Report for CN201480044756.4, dated Apr. 28, 2017 in U300228CN, 9pgs.
(Continued)

*Primary Examiner* — Jason M Greene
(74) *Attorney, Agent, or Firm* — Cantor Colburn LLP

(57) ABSTRACT

A purge system for removing contamination from a chiller system includes a purge chamber including a degassing membrane, the degassing membrane dividing the purge chamber into an inlet portion and an outlet portion, the inlet portion for fluid communication with the chiller system, the degassing membrane to pass contamination from the inlet portion to the outlet portion; a valve coupled to the outlet portion of the purge chamber, the valve providing an exit for contamination from the outlet portion of the purge chamber; and a controller to open or close the valve in response to pressure in the outlet portion of the purge chamber.

14 Claims, 3 Drawing Sheets

(52) U.S. Cl.
CPC .... *F25B 43/043* (2013.01); *F25B 2600/2519* (2013.01); *F25B 2700/19* (2013.01); *F25B 2700/195* (2013.01)

(56) References Cited

U.S. PATENT DOCUMENTS

| | | | |
|---|---|---|---|
| 4,316,364 | A | 2/1982 | Spauschus |
| 4,417,451 | A * | 11/1983 | Spauschus .............. F25B 43/04 62/129 |
| 4,906,256 | A | 3/1990 | Baker et al. |
| 4,984,431 | A | 1/1991 | Mount et al. |
| 5,032,148 | A | 7/1991 | Baker et al. |
| 5,044,166 | A * | 9/1991 | Wijmans ................ B01D 53/22 62/475 |
| 5,062,273 | A | 11/1991 | Lee et al. |
| 5,071,451 | A | 12/1991 | Wijmans |
| 5,089,033 | A | 2/1992 | Wijmans |
| 5,429,662 | A | 7/1995 | Fillet |
| 5,718,119 | A | 2/1998 | Wakita et al. |
| 5,858,065 | A | 1/1999 | Li et al. |
| 6,128,916 | A | 10/2000 | Callahan et al. |
| 6,925,821 | B2 | 8/2005 | Sienel |
| 7,188,480 | B2 | 3/2007 | Korin |
| 7,282,148 | B2 | 10/2007 | Dalton et al. |
| 7,357,002 | B2 | 4/2008 | Yoshimi et al. |
| 8,216,473 | B2 | 7/2012 | Wohlert |
| 8,361,197 | B2 | 1/2013 | Kawai et al. |
| 9,073,808 | B1 | 7/2015 | Su et al. |
| 2007/0101759 | A1 | 5/2007 | Matsuoka et al. |
| 2007/0193285 | A1 | 8/2007 | Knight et al. |
| 2008/0202153 | A1 | 8/2008 | Watanabe |
| 2008/0217247 | A1 | 9/2008 | Niino et al. |
| 2011/0120157 | A1 | 5/2011 | Wohlert |
| 2013/0118198 | A1 * | 5/2013 | Brown ................... F25B 43/04 62/292 |
| 2015/0323226 | A1 | 11/2015 | Haraki et al. |

FOREIGN PATENT DOCUMENTS

| | | |
|---|---|---|
| CN | 201363956 Y | 12/2009 |
| CN | 201954828 U | 8/2011 |
| EP | 1650509 A1 | 4/2006 |
| JP | H10213363 A | 8/1998 |
| JP | 2005127564 A | 5/2005 |
| JP | 11248298 A | 9/2011 |
| JP | 5585307 B2 | 9/2014 |

OTHER PUBLICATIONS

Battelle Memorial Institute, "Cascade Reverse Osmosis and the Absorption Osmosis Cycle", ARPA-E, http://arpa-e.energy.gov/?q=slick-sheet-project/cascade-reverse-osmosis-air-conditioning-systems, release date Jul. 12, 2010, 1 page.

International Search Report for application PCT/US2014/040795, dated Aug. 29, 2014, 4 pages.

Written Opinion for application PCT/US2014/040795, dated Aug. 29, 2014, 4 pages.

Coronas et al., "Separations Using Zeolite Membranes", Separation and Purification Methods, vol. 28, 1999—Issue 2, Abstract Only, 6 pages.

Rao et al., "Nanoporous carbon membranes for separation of gas mixtures by selective surface flow", Journal of Membrane Science, vol. 85, Issue 3, Dec. 2, 1993, pp. 253-264, Abstract Only, 3 pages.

* cited by examiner

US 9,987,568 B2

PURGE SYSTEM FOR CHILLER SYSTEM

BACKGROUND OF THE INVENTION

Embodiments relate generally to chiller systems used in air conditioning systems, and more particularly to a purge system for removing contamination from a chiller system.

Low pressure chiller systems may include sections that operate below atmospheric pressure. As a result, leaks in the chiller system may draw air into the system, contaminating the refrigerant. This contamination degrades the performance of the chiller system. To address this problem, existing low pressure chillers include a purge unit to remove contamination. Existing purge units use the vapor compression cycle to separate contamination from the refrigerant. Existing purge units are complicated and lose refrigerant in the process of removing contamination.

SUMMARY

According to one aspect of the invention, a purge system for removing contamination from a chiller system includes a purge chamber including a degassing membrane, the degassing membrane dividing the purge chamber into an inlet portion and an outlet portion, the inlet portion for fluid communication with the chiller system, the degassing membrane to pass contamination from the inlet portion to the outlet portion; a valve coupled to the outlet portion of the purge chamber, the valve providing an exit for contamination from the outlet portion of the purge chamber; and a controller to open or close the valve in response to pressure in the outlet portion of the purge chamber.

According to another aspect of the invention, a method of decontaminating refrigerant in a chiller system includes generating a pressure differential across a degassing membrane; passing contamination from the refrigerant through the degassing membrane to an outlet portion of a purge chamber; monitoring pressure in the outlet portion of the purge chamber; and discharging the outlet portion of the purge chamber in response to pressure in the outlet portion of the purge chamber.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
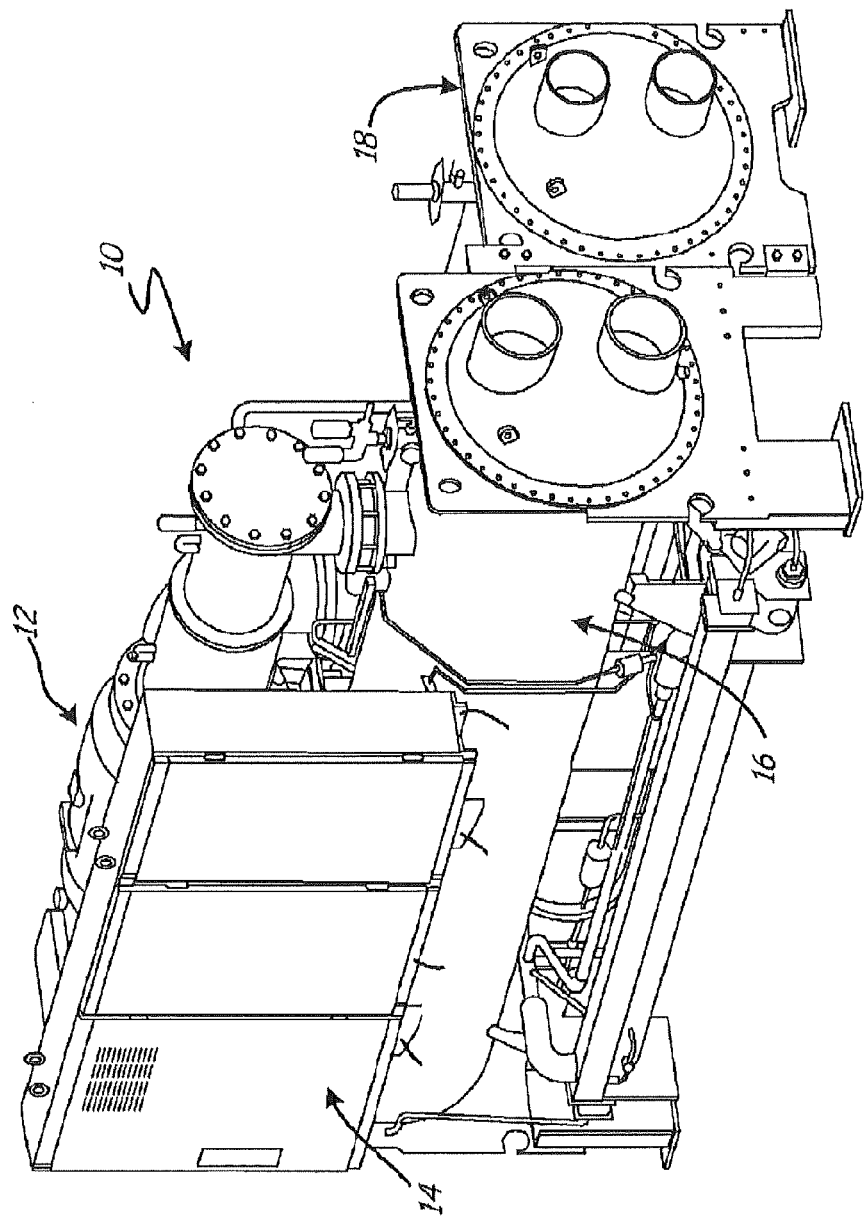
FIG. 1 is a perspective view of a chiller system in an exemplary embodiment.

FIG. 1 depicts a chiller system 10 in an exemplary embodiment. Chiller system 10 is a screw chiller, but embodiments of the invention are appropriate for use with other compression chiller assemblies, such as, for example, a centrifugal chiller. As shown in FIG. 1, chiller system 10 includes compressor 12, variable frequency drive 14, condenser 16 and cooler 18.

In operation, gaseous refrigerant is induced into compressor 12 and compressed. Compressor 12 is driven by a motor under the control of variable frequency drive 14. Variable frequency drive 14 controls the frequency of the alternating current (AC) supplied to the motor thereby controlling the speed of the motor and the output of compressor 12. After the refrigerant is compressed, the high temperature, high pressure refrigerant gas is supplied to condenser 16. In condenser 16, the gaseous refrigerant condenses into liquid as it gives up heat. The condensed liquid refrigerant then flows into cooler 18, which circulates chilled water. The low pressure environment in cooler 18 causes the refrigerant to change states to a gas and, as it does so, it absorbs the required heat of vaporization from the chilled water, thus reducing the temperature of the water. The low pressure vapor is then drawn into the inlet of compressor 12 and the cycle is continually repeated. The chilled water is circulated through a distribution system to cooling coils for, for example, comfort air conditioning.

Figure 2:
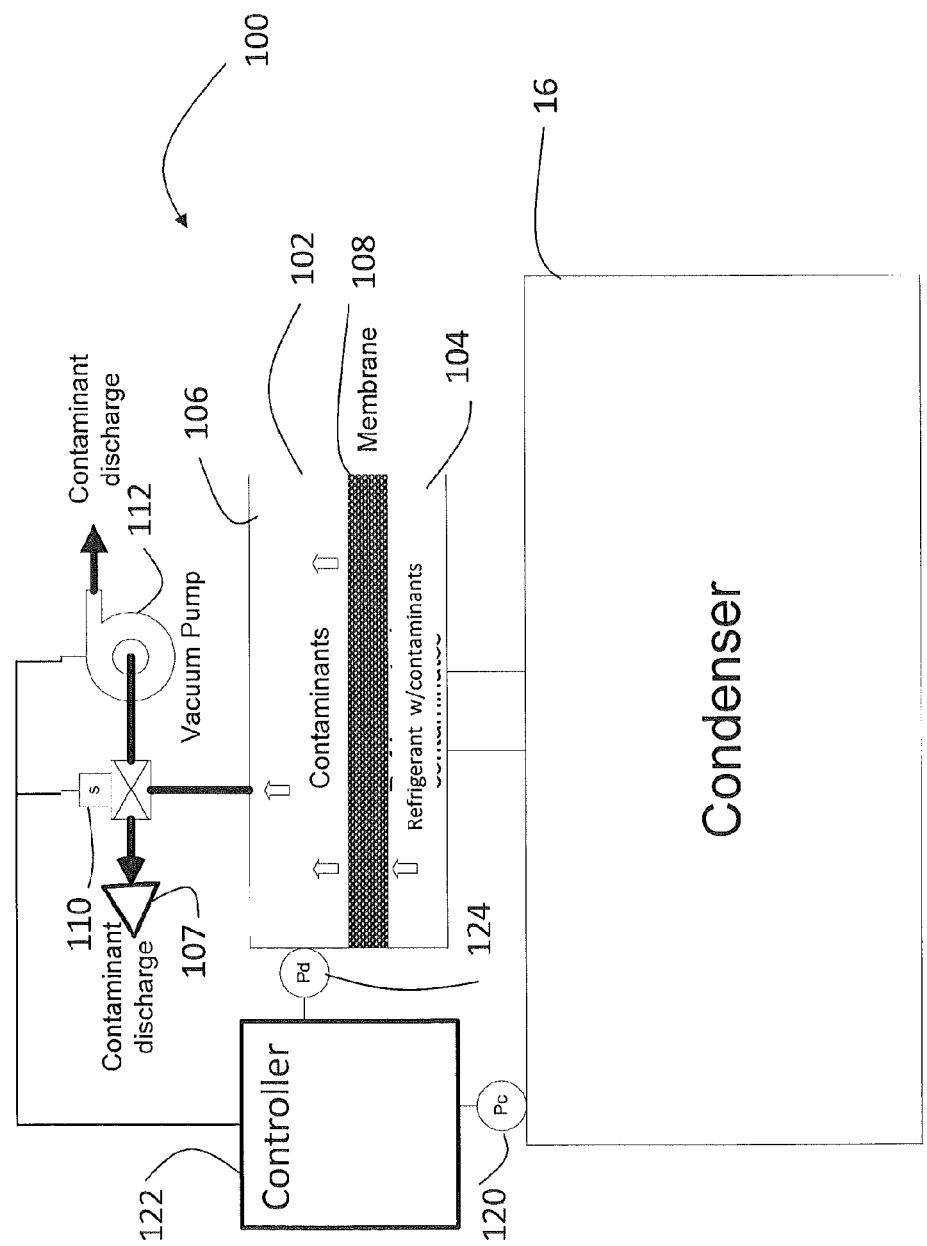
FIG. 2 depicts a purge system in an exemplary embodiment.

Portions of the chiller system 10 (e.g., cooler 18) may operate at a low pressure (e.g., less than atmosphere) which can cause contamination (e.g., ambient air) to be drawn into the chiller system 10. The contamination degrades performance of the chiller. FIG. 2 depicts a purge system 100 for removing contamination from the chiller system in an exemplary embodiment.

Purge system 100 includes a purge chamber 102. Purge chamber 102 is a fluid-tight chamber divided by a degassing membrane 108 into an inlet portion 104 and an outlet portion 106. Degassing membrane 108 allows for the passage of contamination (e.g., air) via simple diffusion or solution-diffusion, but prevents passage of refrigerant. Degassing membrane 108 is selected so that molecules of certain size (e.g., components of air such as oxygen, nitrogen) pass through the degassing membrane 108. In an exemplary embodiment, degassing membrane 108 is a polymer film structured into a hollow fiber. In an exemplary embodiment, the polymer is a BPDA-based aromatic polyimide, which we have found to selectively permeate air over refrigerant via solution-diffusion (BPDA: bi-phenyl di-anhydride). In another exemplary embodiment, degassing membrane 108 could be an nanoporous inorganic layer supported on a microporous film in flat sheet form; in this case the diameter of the nanopores is no larger than 0.37 nm (i.e., slightly larger than the kinetic diameter of nitrogen) such that oxygen and nitrogen molecules can permeate through via simple diffusion while the larger refrigerant molecules cannot.

Inlet portion 104 of purge chamber 102 is in fluid communication with condenser 16. It is understood that the purge chamber 102 may be coupled to the chiller system 10 at locations other than condenser 16. Refrigerant and contamination enter inlet portion 104 of purge chamber 102 through the connection with condenser 16.

Outlet portion 106 of purge chamber 102 is in fluid communication with an outlet valve 110. In an exemplary embodiment, outlet valve 110 is a three way valve having a solenoid that can be positioned in response to a control signal. An inlet to valve 110 is in fluid communication with outlet portion 106 of purge chamber 102. One outlet of valve 110 is exposed to ambient environment. Another outlet of valve 110 is coupled to a vacuum pump 112.

A condenser pressure sensor 120 monitors pressure inside condenser 16 and provides a condenser pressure value to controller 122. Controller 122 may be implemented using a general-purpose microprocessor executing a computer program stored on a storage medium to perform the operations described herein. Alternatively, controller 122 may be implemented in hardware (e.g., ASIC, FPGA) or in a combination of hardware/software. Controller 122 may also be part of an overall chiller control system. A purge chamber pressure sensor 124 monitors pressure in the outlet portion 106 of purge chamber 102 and provides a purge chamber pressure value to controller 122. Controller 122 provides control signals to valve 110 and vacuum pump 112 to control operation of these components depending on the mode of operation and pressure values as described herein.

Figure 3:
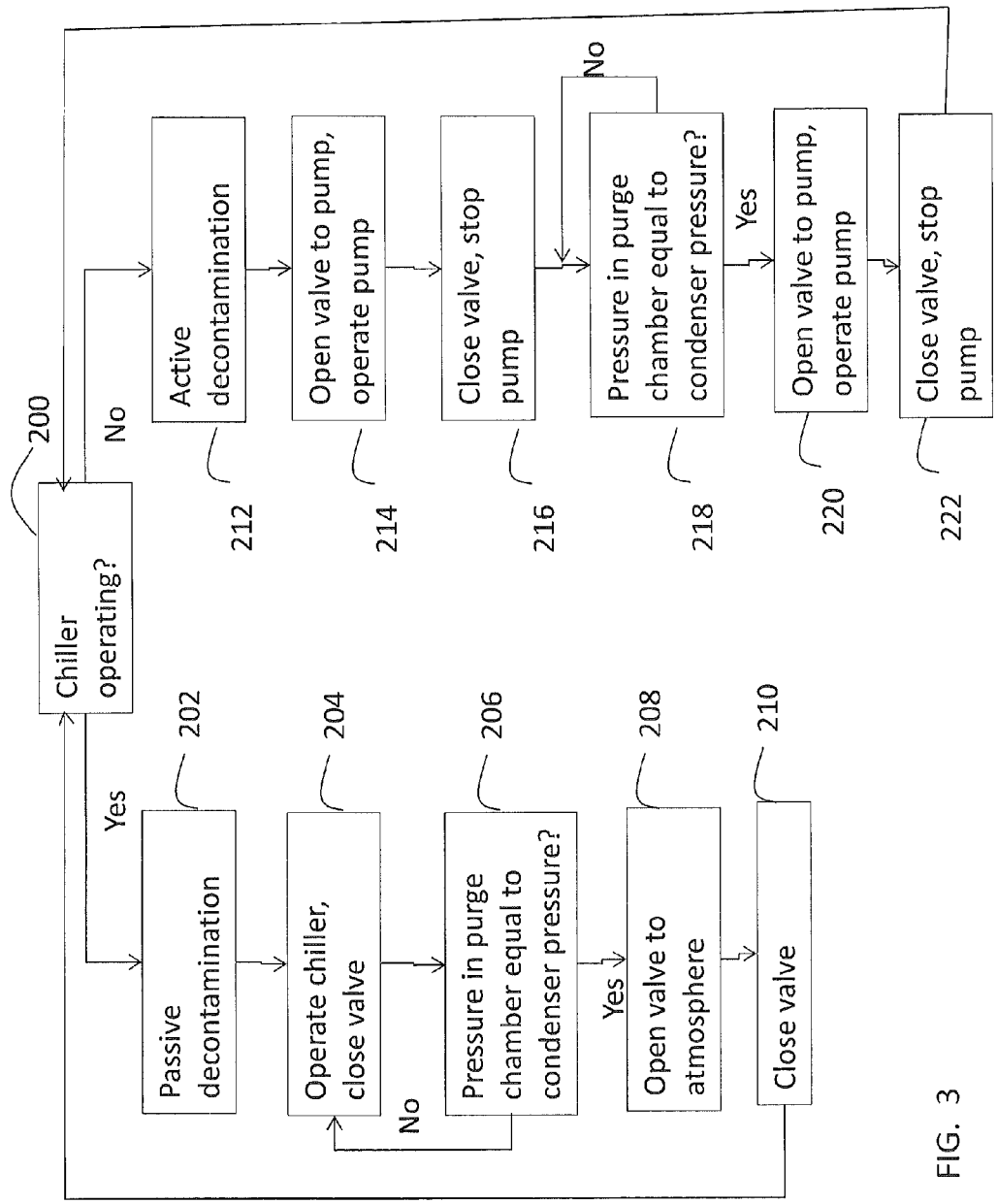
FIG. 3 is a flowchart of a method of operating a purge system in an exemplary embodiment.

FIG. 3 is a flowchart of a process of removing contamination from the chiller system 10 in an exemplary embodiment. The process may be executed by controller 122. The process begins at 200 where controller 122 determines if the chiller system 10 is operating or not. When the chiller system is operating, the pressure in condenser 16 is suitable to provide a partial pressure of air at the purge point to achieve the required driving force across degassing membrane 108 for decontamination. When the chiller system is not operating, vacuum pump 112 is used to provide the pressure differential across degassing membrane 108 for decontamination.

If chiller system 10 is operating, flow proceeds to 202, where a passive decontamination process is initiated. Passive decontamination involves operating the chiller system with valve 110 closed as shown at 204. As chiller system 10 operates, the pressure from condenser 16 creates a pressure differential across the degassing membrane 108. Contamination passes through the degassing membrane 108, from the inlet portion 104 to the outlet portion 106. A check valve 107 prevents air infiltration through the membrane toward the condenser when atmospheric pressure exceeds the partial pressure of air at the purge point. The pressure in the outlet portion 106 of purge chamber 102 is monitored at 206. The pressure in outlet portion 106 of purge chamber 102 will increase as contamination passes into the outlet portion 106. If the pressure in the outlet portion 106 of the purge chamber 102 lacks a predefined relationship to the condenser pressure, flow proceeds to 204. The predefined relationship between the pressure in the outlet portion 106 of purge chamber 102 and the condenser pressure may be equivalence. In other embodiments, the predefined relationship between the pressure in the outlet portion 106 of purge chamber 102 and the condenser pressure may be satisfied when the pressure in the outlet portion 106 of purge chamber 102 is within a certain tolerance (e.g., a percentage or value) of the condenser pressure.

At 206, when the pressure in the outlet portion 106 of the purge chamber 102 has a predefined relationship to the condenser pressure, flow proceeds to 208. At 208, valve 110 is opened to atmosphere to discharge the contamination from the outlet portion 106 of purge chamber 102 and to reestablish a pressure differential across degassing membrane 108. After a predetermined period of time, valve 110 is closed at 210 and flow returns to 200. The timing between cycles of opening valve 110 at 208 enables a measurement of the amount of contamination removed per unit time. When the mass flow rate of the discharged contamination exceeds a predefined criterion, controller 122 may generate an alert for an operator.

If at 200, the chiller is not operating, flow proceeds to 212 where active decontamination is initiated. Active decontamination is used when the chiller is idle, and as such the condenser is not providing a pressure differential across the degassing membrane 108. At 214, controller 122 opens valve 110 to pump 112 and activates pump 112 to lower the pressure in the outlet portion 106 of the purge chamber 102. Controller 122 may monitor the pressure in outlet portion 106 of the purge chamber 102 and stop pump 112 when pressure in the outlet portion 106 of the purge chamber 102 is at a predefined level below the condenser pressure.

At 216, controller 122 closes valve 110 and stops pump 112. Since the outlet portion 106 of the purge chamber 102 is at a lower pressure than condenser, there is sufficient pressure differential across the degassing membrane 108 for contamination to pass from the inlet portion 104 of purge chamber 102 to outlet portion 106 of purge chamber 102.

The pressure in outlet portion 106 of purge chamber 102 is monitored at 218. If the pressure in outlet portion 106 of purge chamber 102 lacks a predefined relationship to the condenser pressure, the process stays at 218. The predefined relationship between the pressure in the outlet portion 106 of purge chamber 102 and the condenser pressure may be equivalence. In other embodiments, the predefined relationship between the pressure in the outlet portion 106 of purge chamber 102 and the condenser pressure may be satisfied when the pressure in the outlet portion 106 of purge chamber 102 is within a certain tolerance (e.g., a percentage or value) of the condenser pressure.

At 218, when the pressure in the outlet portion 106 of the purge chamber 102 has a predefined relationship to the condenser pressure, flow proceeds to 220. At 220, valve 110 is opened to pump 112 and pump 112 is operated to discharge the contamination from the outlet portion 106 of purge chamber 102 and to reestablish a pressure differential across degassing membrane 108. After a predetermined period of time, at 222, valve 110 is closed, pump 112 stopped and flow returns to 200. The timing between cycles of opening valve 110 at 220 enables a measurement of the amount of contamination removed per unit time. When the mass flow rate of the discharged contamination exceeds predefined criteria, controller 122 may generate an alert for an operator.

Embodiments provide a number of advantages. Instead of using the vapor compression cycle of the refrigeration unit, embodiments employ a degassing membrane to separate contamination from the refrigerant charge of a chiller via simple diffusion or solution-diffusion. Compared with conventional purge system, embodiments have fewer mechanical parts and less refrigerant emission, and are more reliable. Embodiments also more efficiently remove contamination, with less refrigerant loss.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A purge system for removing contamination from a chiller system, the purge system comprising:

a purge chamber including a degassing membrane, the degassing membrane dividing the purge chamber into an inlet portion and an outlet portion, the inlet portion for fluid communication with the chiller system, the degassing membrane to pass contamination from the inlet portion to the outlet portion;

a valve coupled to the outlet portion of the purge chamber, the valve providing an exit for contamination from the outlet portion of the purge chamber;

a pressure sensor for sensing pressure in the outlet portion of the purge chamber; and a controller to open or close the valve in response to pressure in the outlet portion of the purge chamber;

the controller configured to passively discharge the outlet portion of the purge chamber if the chiller system is operating; and the controller configured to actively discharge the outlet portion of the purge chamber if the chiller system is not operating.

2. The purge system of claim 1 further comprising:
a second pressure sensor for sensing pressure in the chiller system.

3. The purge system of claim 2 wherein:
the controller opens the valve in response to pressure in the outlet portion of the purge chamber and pressure in the chiller system.

4. The purge system of claim 3 wherein:
the controller opens the valve in response to pressure in the outlet portion of the purge chamber having a predefined relationship to pressure in the chiller system.

5. The purge system of claim 2 further comprising:
a vacuum pump connected to the valve.

6. The purge system of claim 5 wherein:
the controller opens the valve and starts the vacuum pump in response to pressure in the outlet portion of the purge chamber and pressure in the chiller system.

7. The purge system of claim 5 wherein:
the controller opens the valve and starts the vacuum pump in response to pressure in the outlet portion of the purge chamber having a predefined relationship to pressure in the chiller system.

8. The purge system of claim 1 wherein:
the controller monitors an amount of contamination discharged from the outlet portion of the purge chamber; and the controller generates an alert when a mass flow rate of contamination discharged from the outlet portion of the purge chamber exceeds a predefined criterion.

9. A method of decontaminating refrigerant in a chiller system, the method comprising:
generating a pressure differential across a degassing membrane;

passing contamination from the refrigerant through the degassing membrane to an outlet portion of a purge chamber;

monitoring pressure in the outlet portion of the purge chamber; and discharging the outlet portion of the purge chamber in response to pressure in the outlet portion of the purge chamber;

wherein the discharging comprises determining if the chiller system is operating;

passively discharging the outlet portion of the purge chamber if the chiller system is operating; and actively discharging the outlet portion of the purge chamber if the chiller system is not operating.

10. The method of claim 9 wherein:
discharging the outlet portion of the purge chamber is in response to pressure in the outlet portion of the purge chamber and pressure in the chiller system.

11. The method of claim 9 wherein:
discharging the outlet portion of the purge chamber is in response to pressure in the outlet portion of the purge chamber having a predefined relationship to pressure in the chiller system.

12. The method of claim 9 wherein:
passively discharging the outlet portion of the purge chamber includes exposing the outlet portion of the purge chamber to ambient air.

13. The method of claim 9 wherein:
actively discharging the outlet portion of the purge chamber includes applying a vacuum to the outlet portion of the purge chamber.

14. The method of claim 9 further comprising:
monitoring an amount of contamination discharged from the outlet portion of the purge chamber; and generating an alert when a mass flow rate of contamination discharged from the outlet portion of the purge chamber exceeds a predefined criterion.

\* \* \* \* \*